March 23, 1965

L. E. GREGORY

Re. 25,746

HYDRAULICALLY OPERATED LAZY TONGS STRUCTURE

Original Filed July 15, 1960

Inventor
Louie E. Gregory

Andrew F. Winterscheidt
Atty

United States Patent Office

Re. 25,746
Reissued Mar. 23, 1965

25,746
HYDRAULICALLY OPERATED LAZY TONGS STRUCTURE

Louie E. Gregory, 2345 S. 21st St., Rockford, Ill.

Original No. 3,095,061, dated June 25, 1963, Ser. No. 43,182, July 15, 1960. Application for reissue May 25, 1964, Ser. No. 380,732
9 Claims. (Cl. 182—141)

Matter enclosed in heavy brackets [ ] appears in the original patent but forms no part of this reissue specification; matter printed in italics indicates the additions made by reissue.

This invention relates to a new and improved hydraulically operated lazy tongs boom structure.

The present lazy tongs boom structure was specially designed to be used in fruit picking, but it should be obvious that the invention is useful wherever the operator standing or sitting in the cab carried on the outer end of the lazy tongs can by manipulation of three control levers in either direction from a neutral position select up or down motion, right or left motion, or outward or inward motion, as desired. The cab is carried on a yoke fixed to the outer end of the lazy tongs, the yoke suspending the cab on a diametrically extending horizontal axis, so that the cab assumes a vertical position by gravity in any position of extension or elevation of the lazy tongs, but may be quickly and easily locked in its new position by means of a catch pivoted on the outer end portion of the lazy tongs and lockingly engaged in one side wall of the cab, the operator attending to this unlocking and locking upon each adjustment of the cab's position, or as often as necessary.

In accordance with my invention the lazy tongs is pivotally suspended at its inner end on the upper end of a vertical standard or pole with respect to which a vertically extending guide channel is pivotally mounted on a horizontal axis at its upper end behind the lazy tongs and has the lower rear portion of the lazy tongs guided therein for up and down motion and operable by means of a vertical hydraulic jack up or down in the channel for extension or contraction of the lazy tongs, while the channel itself is also operable inwardly or outwardly intermediate its ends by means of another hydraulic jack that is horizontally disposed so as to swing the lazy tongs about its upper pivot and accordingly raise or lower the cab suspended on the outer end of the lazy tongs. This, therefore, takes care of two of the three kinds of movement of the cab, namely, up or down and outwardly or inwardly. The standard or pole is swivelled on a vertical axis and has a horizontal radius arm on one end to which are connected two other jacks working horizontally from opposite sides of said arm whereby to swing the lazy tongs to the right or left, as desired.

The invention is illustrated in the accompanying drawing, in which—

The same reference numerals are applied to corresponding parts throughout the views.

Figure 1:
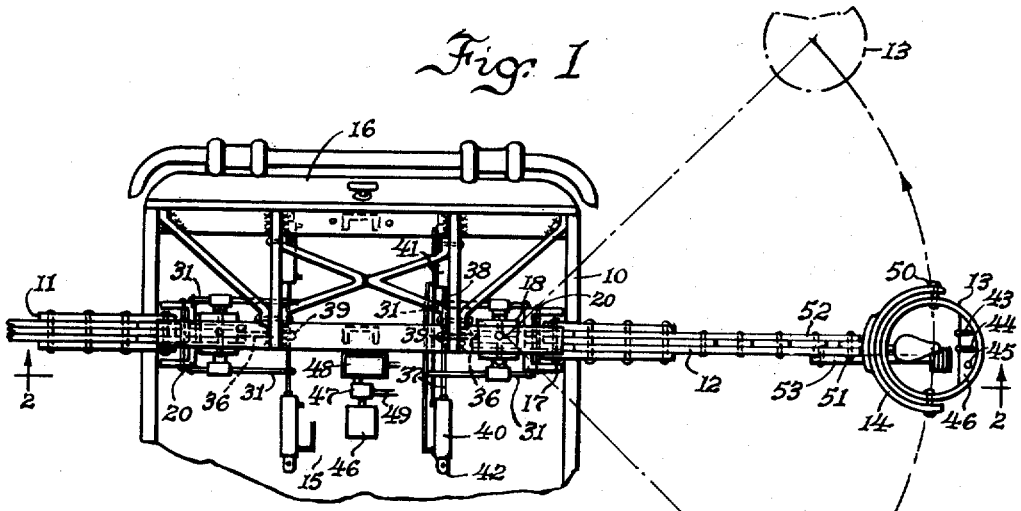
FIG. 1 is a plan view of a hydraulically operated lazy tongs boom structure made in accordance with my invention.

Referring to the drawing, the supporting frame 10, from opposite sides of which the lazy tongs booms 11 and 12 extend, each carrying a cab 13 suspended on a yoke 14 on its outer end, is mounted on a base 15, which in turn is suitably secured to the floor 16 of a truck that can be driven like any other truck to the site of operations, and, of course, shifted about as the occasion arises. Thus, for example, in fruit picking, the truck may be driven between two rows of fruit trees and the lazy tongs booms 11 and 12 can be extended in opposite directions to trees in the two rows, under control of the fruit pickers in the cabs 13. In that way very little shifting in the position of the truck will be necessary in order to enable the two men to reach all parts of the trees being picked, as each man can shift his cab's position at will, outwardly or inwardly, up or down, or to the right or left, as the need for such changes in position arise. The bags into which the fruit is placed by the pickers can be suitably attached to the cabs 13, so that there is very little likelihood of fruit being damaged, because the fruit is never dropped far enough in the picking operation, and the filled bags can be lowered with the cab 13 for removal and attachment of empty bags. Thus, three men with such a rig, two to do the picking and the other to run the truck and attend to the filled bags, can do the work of many more doing this kind of work the old way. Furthermore, there is much less likelihood of damage being done to the trees, and there is no danger of the fruit pickers falling and suffering serious injury or even death. The fruit grower can offer a better product at lower price and still make as much or more profit.

Figure 2:
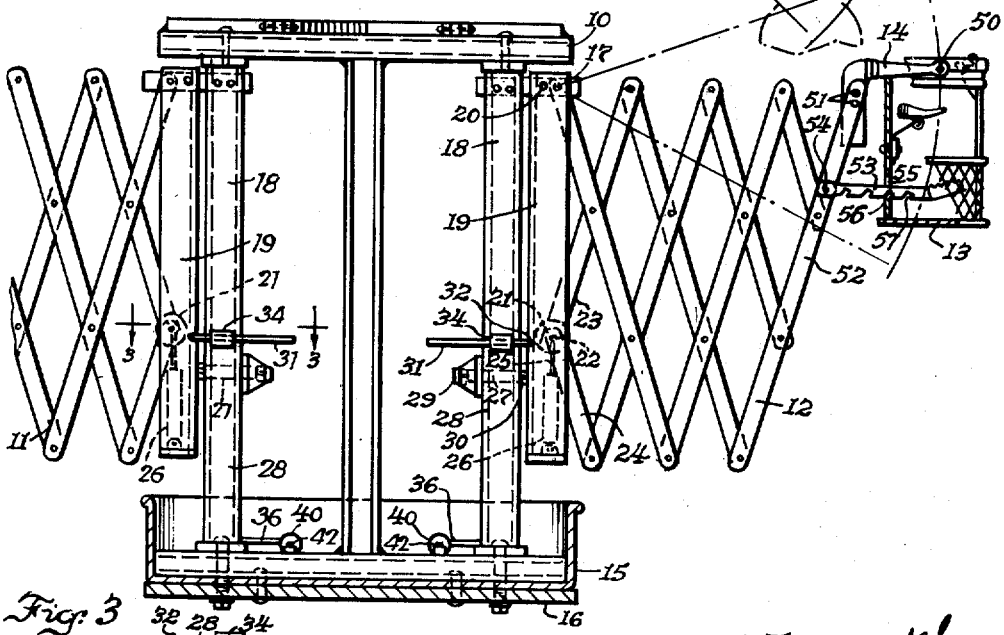
FIG. 2 is a view partly in side elevation and partly in vertical section on the line 2—2 of FIG. 1.
Figure 3:
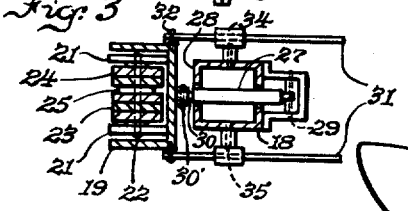
FIG. 3 is an enlarged horizontal sectional detail on the line 3—3 of FIG. 2.

Inasmuch as the two units on the truck carrying the cabs 13 are alike, the description of one will suffice for both. Referring to lazy tongs boom 12, it will be seen that it is of an outwardly tapered single four-pivot construction, as distinguished from the conventional non-tapered three-pivot construction, that is to say, it is 50% wider than ordinary ones in a vertical plane, as seen in FIG. 2, and built up to increased thickness at the inner end, as seen in FIG. 1, for all around increased strength and rigidity, and has its upper inner end pivoted as at 17 relative to the upper end of the standard or pole 18, and there is a vertical guide channel 19 also pivoted at its upper end as at 20 behind the lazy tongs, the channel 19 having the rollers 21 carried on the inner lower portion of the lazy tongs working therein, so that the pin 22, on the opposite ends of which the rollers 21 are mounted, as shown in FIG. 3, and to which the two arms 23 and three arms 24 are also pivotally connected, can be adjusted up or down by means of the plunger 25 of a vertical hydraulic jack 26 that is mounted in the lower end of the channel 19, whereby, when oil or other fluid under pressure is admitted to one end of the jack 26, the cab 13 is moved outwardly with the extension of the lazy tongs 12, and, when the fluid is admitted to the other end of the jack 26, the cab 13 is moved inwardly in the contraction or folding of the lazy tongs 12. In any position of extension or contraction of the lazy tongs 12, the cab 13 may be raised by giving the guide channel 19 outward movement relative to the standard or pole 18, and for that purpose another hydraulic jack 27 that is horizontally disposed is provided between the two channels 28 which together form the pole 18, the jack 27 being pivoted on a horizontal axis at 29 relative to the pole for oscillatory movement in a vertical plane between the two channels 28 and having its plunger 30 pivoted on a horizontal axis as at 30' to the back of the channel 19. Thus, when the oil or other fluid is admitted to one end of cylinder 27, channel 19 is swung outwardly to raise the cab 13, and vice versa when the fluid is admitted to the other end of the cylinder 27. A pair of stabilizer rods 31 pivoted at the opposite sides of the channel 19 on horizontal axes, as indicated at 32, are slidable endwise in guide blocks 34 swivelled on horizontal axes, as indicated at 35, on opposite sides of the pole 18, and serve to provide lateral support for the lower end portion of the channel 19 when the channel is swung outwardly from the pole 18 to elevate the cab 13. Obviously, only a small angle shift of channel 19 outwardly relative to pole 18 is enough to secure an appreciable change in elevation of the cab 13, especially when the lazy tongs boom 12 is extended appreciably.

To give the cab 13 movement to the right or left, with or without any change in its elevation, it is only necessary to turn the pole 18 through the required angle, and that is accomplished by oscillating a horizontal radius arm 36 that extends inwardly from the lower end portion of the pole 18, and has horizontal plungers 37 and 38 pivotally connected to the inner end thereof on a vertical axis, as indicated at 39, the plungers 37 and 38 operating in horizontal jack cylinders 40 and 41, respectively, which in turn are pivoted to the base 15 on vertical axes, as indicated at 42. Thus, when the oil or other fluid is admitted under pressure to the rear end of cylinder 40 and simultaneously to the front end of cylinder 41, the pole 18 is turned in a clockwise direction, as viewed in FIG. 1, to swing the lazy tongs boom 12 to the right and move the cab 13 accordingly in that direction, and vice versa when the fluid is delivered to the front end of cylinder 40 and rear end of cylinder 41.

Three control levers 43, 44 and 45 are provided on a control panel 46 in the cab 13. One (43), when moved from a central neutral position to the right, will through a reversible electric motor or a solenoid operate a valve from a neutral position to deliver the oil or other fluid under pressure to the rear end of cylinder 40 and front end of cylinder 41 to turn the pole 18 in a clockwise direction and accordingly swing the lazy tongs boom 12 to the right to give the cab 13 movement in that direction, and vice versa when the control lever 43 is swung to the left from neutral position, the cab 13 being stopped at any selected position by returning lever 43 to neutral. Lever 44 is similarly connected through a reversible electric motor or a solenoid and valve to jack 27 to control the elevation of the cab 13 by admitting the oil or other fluid under pressure to the rear end of cylinder 27 when the lever 44 is raised from neutral position to raise the cab 13 by outward swinging of channel 19, and vice versa when lever 44 is swung downwardly. Lever 45, which is normally in a vertical position but adapted to be swung forwardly or rearwardly from the vertical neutral position, is similarly connected with a valve and reversible electric motor or solenoid to jack 26 to control the delivery of oil or other fluid under pressure to either end of the jack cylinder 26, and, when the lever 45 is moved forwardly, the oil is delivered to the lower end of cylinder 26 to extend the lazy tongs boom 12 for extension thereof, and vice versa when the lever 45 is swung rearwardly from the neutral vertical position. An electric motor 46 is shown in FIG. 1, driving a pump 47 to pump oil from a tank 48 and deliver it through a conduit 49 continuously to the three valves previously mentioned, at a predetermined pressure, a relief valve being provided in the discharge line to open and return fluid to the tank 48 when the fluid is not being used and the pressure builds up beyond a predetermined point. Hydraulic controls of this general type are well known, and there is no need therefore to illustrate the same, and it would only encumber and complicate the disclosure to no purpose.

The yoke 14, in which the cab 13 is suspended diametrically of its upper end on a horizontal axis, as indicated at 50, is rigidly secured to the outer upper end of lazy tongs boom 12, as indicated at 51, and, inasmuch as the yoke 14 changes its angle with respect to a horizontal plane as the two outermost arms 52 change their angularity with respect to a vertical plane through axis 50 in the extension of the lazy tongs boom 12 and in the swinging of said lazy tongs boom about the pivot 17, a catch 53 is provided pivoted on a horizontal axis as at 54 with respect to one of the arms 52 and extending through a slot 55 in the rear wall of the cab 13 to secure the latter detachably at a fixed angularity with respect to the arms

52 by engagement of a lug 56 on the cab in any one of a series of notches 57 provided in the catch 53.

The operation of the lazy tongs boom structure is believed to be clear from the foregoing description, and, while the invention has been described with particular reference to its use in fruit picking for which the structure was especially designed, it should be clear that the invention is useful wherever an operator standing or sitting in a cab carried on the outer end of the lazy tongs can by manipulation of the three control levers in either direction from a neutral position select up or down motion, motion to the right or left, or motion outwardly or inwardly, as desired. Also, while I have shown in FIG. 1 two lazy tongs boom units, operating in opposite directions, it is obvious that only one such unit may be provided in a rig intended for some other purpose, or more than two lazy tongs boom units could be provided for other purposes.

It is believed the foregoing descrpition conveys a good understanding of the objects and advantages of my invention. The appended claims have been drawn to cover all legitimate modifications and adaptations.

I claim:

[1. In combination in a lazy tongs structure, a supporting frame having horizontal top and bottom members in a fixed vertically spaced relationship, a vertical standard mounted for support between said top and bottom frame members, an elongated guide member pivotally suspended on a horizontal axis at its upper end on the upper end portion of said standard adjacent said top frame member and disposed alongside said standard, a lazy tongs boom disposed in a vertical plane and pivotally suspended on a horizontal axis at the upper end of its inner end portion relative to the upper ends of said standard and guide member and having its lower inner end portion supported on said guide member for up and down movement, power operable jack means carried vertically on the lower end portion of said guide member and operatively connected with the lower inner end portion of said lazy tongs boom to cause extension and return of said boom, a load carrier mounted on the outer end of said boom, and power operable jack means carried horizontally on said standard and operatively connected with the lower end portion of said guide member to swing it and said lazy tongs boom with it upwardly relative to said standard to raise the load carrier and support it at different selected elevations.]

2. A structure as set forth in claim 1 wherein said standard is pivoted on a vertical axis relative to said top and bottom frame members, the combination including power operable jack means carried horizontally on one of said top and bottom frame members and operatively connected with a horizontal radius arm on the adjacent end of said standard to turn said standard and the lazy tongs boom with it about the said vertical axis.

3. A structure as set forth in claim 1 wherein said guide member is of channel form with the lower inner end of said lazy tongs boom guided in said channel between the side walls thereof, the structure including roller means on said boom rolling on the transverse wall of the channel for anti-friction purposes.

4. A structure as set forth in claim 1 including parallel horizontal stabilizer rods pivotally connected at one end on horizontal axes to the guide member intermediate the ends thereof and slidable in horizontal bearings swivelled on opposite sides of said standard intermediate the ends thereof.

5. A structure as set forth in claim 1 including a horizontal yoke on the outer end of said boom, in which the load carrier is pivotally suspended on a horizontal axis diametrically of the upper end thereof, whereby the load carrier gravitates to a vertical position in any position of outward and/or upward adjustment of said boom.

6. A structure as set forth in claim 1 including a horizontal yoke on the outer end of said boom, in which the load carrier is pivotally suspended on a horizontal axis diametrically of the upper end thereof, whereby the load carrier gravitates to a vertical position in any position of outward and/or upward adjustment of said boom, the structure including manually operable means for detachably locking the load carrier in a fixed relationship to the outer end of said boom.

7. A structure as set forth in claim 2 wherein the jack means comprises opposed fluid operable piston and cylinder devices pivotally mounted on vertical axes in a fixed radially spaced relationship to the vertical axis of said standard and pivotally connected on a vertical axis to said radius arm on said standard, said devices having their cylinders cross-connected to operate in reverse relationship to one another so that one pulls on said arm while the other pushes, and vice versa.

8. A structure as set forth in claim 1 wherein the lazy tongs boom has additional plies or arms applied on opposite sides of the inner end portion for increased thickness and increased strength and rigidity of said boom.

*9. In combination in a lazy tongs structure, a supporting frame having horizontal top and bottom members in a fixed vertically spaced relationship, a vertical standard mounted for support between said top and bottom frame members, an elongated guide member pivotally suspended on a horizontal axis at its upper end on the upper end portion of said standard adjacent said top frame member and disposed alongside said standard, a lazy tongs boom disposed in a vertical plane and pivotally suspended on a horizontal axis at the upper end of its inner end portion relative to the upper ends of said standard and guide member and having its lower inner end portion supported on said guide member for up and down movement, power operable jack means supported in fixed relation to said guide member and connected with the lower inner end portion of said lazy tongs boom to cause extension and return of said boom, a load carrier mounted on the outer end of said boom, and power operable jack means operatively connected between the standard and the guide member to swing it and said lazy tongs boom with it upwardly relative to said standard to raise the load carrier and support it at different selected elevations.*

*10. In combination in a lazy tongs structure, a supporting frame having horizontal top and bottom members in a fixed vertically spaced relationship, a vertical standard mounted for support between said top and bottom frame members, an elongated guide member pivotally suspended on a horizontal axis at its upper end on the upper end portion of said standard adjacent said top frame member and disposed alongside said standard, a lazy tongs boom disposed in a vertical plane and pivotally suspended on a horizontal axis at the upper end of its inner end portion relative to the upper ends of said standard and guide member and having its lower inner end portion supported on said guide member for up and down movement, power operable jack means carried substantially vertically on the lower end portion of said guide member and operatively connected with the lower inner end portion of said lazy tongs boom to cause extension and return of said boom, a load carrier mounted on the outer end of said boom, and power operable jack means carried substantially horizontally on said standard and operatively connected with the lower end portion of said guide member to swing it and said lazy tongs boom with it upwardly relative to said standard to raise the load carrier and support it at different selected elevations.*

References Cited by the Examiner

The following references, cited by the Examiner, are on record in the patented file of this patent or the original patent.

UNITED STATES PATENTS

| | | |
|---|---|---|
| 943,672 | 12/09 | Flynn. |
| 1,771,782 | 7/30 | Gese. |
| 2,118,337 | 5/38 | Blanchard. |
| 2,255,461 | 9/41 | Williams. |
| 2,650,649 | 9/53 | Lorenz. |
| 2,674,500 | 4/54 | Hukari. |
| 2,927,705 | 3/60 | Girardi. |

FOREIGN PATENTS

| | | |
|---|---|---|
| 1,020,454 | 12/57 | Germany. |
| 746,283 | 3/56 | Great Britain. |

HARRISON R. MOSELEY, *Primary Examiner.*

REINALDO P. MACHADO, *Examiner.*